United States Patent
Roddy

Patent Number: 5,812,237
Date of Patent: Sep. 22, 1998

[54] OPHTHALMIC NO-LINE PROGRESSIVE ADDITION LENSES

[76] Inventor: Kenneth C. Roddy, P.O. Box 990, Jenks, Okla. 74037

[21] Appl. No.: 749,995

[22] Filed: Nov. 18, 1996

Related U.S. Application Data

[60] Provisional application No. 60/007,550, Nov. 27, 1995.

[51] Int. Cl.$^6$ .................. G02C 7/06; G02C 7/04
[52] U.S. Cl. .................. 351/169; 351/168; 351/161
[58] Field of Search .................. 351/159, 161, 351/168, 169, 171, 61, 172

[56] References Cited

U.S. PATENT DOCUMENTS

| | | | |
|---|---|---|---|
| 2,869,422 | 1/1959 | Cretin-Maitenaz | 88/54 |
| 4,274,717 | 6/1981 | Davenport | 351/169 |
| 4,484,804 | 11/1984 | Mignen | 351/168 |
| 4,676,610 | 6/1987 | Barken et al. | 351/169 |
| 4,729,651 | 3/1988 | Kitani | 351/169 |
| 4,955,712 | 9/1990 | Barth et al. | 351/169 |
| 4,988,182 | 1/1991 | Takahashi et al. | 351/169 |
| 5,166,711 | 11/1992 | Portney | 351/161 |
| 5,235,359 | 8/1993 | Chauveau et al. | 351/169 |
| 5,245,366 | 9/1993 | Svochak | 351/161 |
| 5,270,745 | 12/1993 | Pedrono | 351/169 |
| 5,272,495 | 12/1993 | Pedrono | 351/169 |
| 5,446,508 | 8/1995 | Kitchen | 351/169 |
| 5,517,259 | 5/1996 | Blum et al. | 351/160 R |
| 5,691,797 | 11/1997 | Seidner et al. | 351/161 |

FOREIGN PATENT DOCUMENTS

| | | |
|---|---|---|
| 1 484 382 | 9/1977 | European Pat. Off. . |
| 2 092 772 | 8/1982 | United Kingdom . |

OTHER PUBLICATIONS

John K. Davis, "Aspheric Lenses: What's Possible—And What Isn't", Review of Optometry, May, 1978, pp. 68–74.

Irvin M. Borish et al., "Double masked study of progressive addition lenses", Journal of the American Optometric Association, vol. 51, No. 10, Oct., 1980, pp. 933–943.

James E. Sheedy et al., "Vertical Yoked Prism—Patient Acceptance and Postural Adjustment", Ophthal. physiol. Opt., vol. 7, No. 3, 1987, pp. 255–257. Please note p. 256 is missing and will be provided if it becaoms available to applicant.

James E. Sheedy et al., "Optics of Progressive Addition Lenses", American Journal of Optometry & Physiological Optics, vol. 64, No. 2, Feb., 1987, pp. 90–99.

George K. Lee, "Fine Turn Your Understanding of PAL Designs", Review of Optometry, Jan. 15, 1995, pp. 69–70 and 76.

Primary Examiner—Frank G. Font
Assistant Examiner—Michael P. Stafira
Attorney, Agent, or Firm—Craig W. Roddy

[57] ABSTRACT

Opthalmic no-line progressive addition lenses for spectacles are provided with increased sizes of usable intermediate and near addition zones. A preferred lens of the present invention comprises a distance zone, one or more intermediate addition zones and a near add zone wherein each of the zones has a generally spherical base curve. The intermediate and near addition zones are combined with the distance zone by connecting wedges which have aspheric base curves. An aspheric fringe is used to flatten the peripheral area of the bottom portion of the lens, thereby providing a thin and cosmetically acceptable lens.

20 Claims, 3 Drawing Sheets

OPHTHALMIC NO-LINE PROGRESSIVE ADDITION LENSES

CROSS REFERENCE TO RELATED APPLICATION

This application claims the benefit of U.S. Provisional Application No. 60/007,550, filed Nov. 27, 1995.

BACKGROUND

The present invention relates generally to ophthalmic lenses, and more particularly to improved ophthalmic no-line progressive addition lenses for spectacles.

It is known that as a person ages their eyes' accommodative ability decreases. This condition is called presbyopia and most people become symptomatic for presbyopia between 40 and 45 years of age. At present, the only way to relieve this condition is to employ the use of lenses with either the entire lens or a segment thereof having a more convex front surface, known in the optical industry as plus addition, near addition or add.

Multifocal lenses such as bifocal and trifocal lenses have been devised to aid the vision of persons who suffer from reduced powers of accommodation. The bifocal lens, for example, is in effect formed from two separate segments of different dioptric powers. The power of one segment is such that vision through it permits focusing on near objects such as reading matter. The other segment corrects the vision for viewing distant objects.

There have been many lined bifocal lens designs from the Ben Franklin bifocal of 1785 to the present day lined bifocals. An abrupt change in curvature on the front surface of these bifocal lenses creates the lines and produces undesirable optical and cosmetic effects.

Attempts have been made in the past to eliminate lines of optical demarcation in bifocal and trifocal lenses. One solution to this problem is to provide an intermediate region between the near and far vision segments having properties that vary gradually with distance over the surface so as to provide a gradual transition between the near and distance portions of the lens. Such lenses are frequently referred to as progressive addition lenses. Furthermore, because of the age related stigma that is associated with the use of lined bifocals, the demand for improved no-line progressive addition lenses has significantly increased in recent years.

Known progressive addition lenses have aspheric front surfaces that are ellipsoidal or resemble ellipsoidals. It has been suggested that these aspheric ellipsoidal surfaces are made by adjoining conic sections, which may more closely resemble parabolas or hyperbolas, of different elliptical curves to create the increasing convexity desired for the near add.

While known progressive addition lenses are advantageous in providing variable focusing powers as one looks down the lens, they are disadvantageous because the intermediate and near addition zones are small in width and are surrounded by areas of moderate to high unwanted cylinder values, which the optical industry refers to as astigmatism. Astigmatism is what creates large areas of blur and distortion seen in many of today's known progressive addition lenses. Although the optics of known progressive addition lenses may be altered to make hard and soft designs, mono and multiple designs, and symmetric or asymmetric designs, each lens typically has the same problem of narrow intermediate corridors and small near addition zones with large areas of blur and distortion.

There have been few major advances in the designs of progressive addition lenses in the last 10 to 15 years, and thus, there are limitations with respect to known progressive addition lens designs and theories. A first limitation is there needs to be an infinite number of dioptric changes in the intermediate zone for the patient to see clearly at all distances. It is well known that a person's pupils get smaller with age, thereby allowing the person to have an increased depth of field and depth of focus. Also, presbyopia does not imply that all accommodative ability is suddenly lost. On the contrary, many people can still accommodate 0.25 to 0.50 diopters in their seventh to eighth decade of life. By making the intermediate zone with a finite number of addition steps the dimensions of the intermediate zone(s) and near zone can be greatly increased without compromising clear vision. The dioptric changes can also be done in small enough steps that it will yield little visual confusion as the patient moves down the lens from one addition zone to the next. Therefore, increasing the usable dimensions of the intermediate zone(s) would be very advantageous because the demand for intermediate reading, i.e., computers, is increasing and patients need the intermediate powers for longer periods of time.

Another limitation is theories currently employed for designing the ellipsoidal surfaces are comparable and the only known way that a no-line progressive addition lens can be made. Therefore, it would be desirable to provide a lens which yields a substantially different aspheric front surface and which has improved qualities from known progressive addition lenses.

A further limitation is there must be no definite areas of power change in the distance–intermediate or intermediate–near junction zones. While an infinite number of dioptric changes does yield a smooth progression it also restricts the dimensions of the intermediate and near zones and creates distortion in the peripheral area of known progressive addition lens designs. Hence, it would be desirable to have a lens with small power changes in these zones without causing significant visual disturbance and such that the patient can easily adapt.

As will become more apparent from the discussion which follows, many disadvantages of known progressive addition lenses have been effectively overcome by the unique lenses of the present invention. Furthermore, in a highly novel manner, embodiments of the present invention provide no-line progressive addition lenses which reduce areas of distortion, increase the usable size of the intermediate addition zone(s), and increase the usable size of the near addition zone.

SUMMARY

Preferred embodiments of the present invention comprise ophthalmic no-line progressive addition lenses which are made of refractory material, have reduced areas of distortion and have increased usable sizes of intermediate and near addition zones. These preferred lenses have unique optics such that the number of intermediate zone(s); the intermediate and near zone's horizontal, vertical, and circumferential dimensions; and the power addition changes are not dependant on each other and are variable.

The progressive addition lenses of the present invention comprise distance and near zones with generally spherical base curves, wherein the distance and near zones are connected by areas having aspheric base curves. These aspheric connecting areas are referred to herein as a connecting wedge(s) and zone(s) of inflection elimination (ZIE). Additionally, the preferred lenses may also include zero to an infinite number of intermediate zones which have generally spherical base curves. Wherefore, the near and any intermediate zone(s) are all connected with the distance zone by the connecting wedges and zone(s) of inflection elimination. The connecting wedges combine the near and intermediate zones, zone(s) of inflection elimination and an aspheric fringe with the distance zone on both the left and right sides of the front surface without lines and are produced through various methods, as discussed below, any of which may be used to achieve the desired results of the present invention.

First, the connecting wedges can be created using radial progressive optics (the mathematical expressions as set forth in the detailed description), wherein the connecting wedges will have isocylindrical values. Since this type of connecting wedge does not conform to any standard geometric shape, the value for the isocylindrical values can most easily be calculated by making a prototype and measuring the astigmatism with a standard lensmeter that is modified to measure progressive addition lenses. Modification of the lensmeter for this purpose is known in the art.

Second, the connecting wedges can be produced by generating a doughnut toroidal surface. The doughnut toroidal surface will yield isocylindrical values with the astigmatism zones corresponding to their respective intermediate and near zones, zone(s) of inflection elimination, and aspheric fringe.

Third, the connecting wedges can be produced by filling the connecting area with a smooth surface that abuts to the top and bottom portions of the zones without creating inflection points or lines. This design does not need to have a specific geometric definition.

In preferred embodiments of the present invention, the first add zone located nearest to the optical center of the lens comprises a generally semi-circular shaped surface area while the additional add zone(s) and zone(s) of inflection elimination, if any, and the aspheric fringe comprise a generally semi-annular shaped surface area. Thus, the add zone(s) are preferably defined and separated by zones of inflection elimination or optical power changes that generally have radial equidistances from the optical center of the lens. Likewise, the aspheric fringe is generally radially equidistant from the optical center.

Lenses of the present invention are advantageous in providing large, usable zones of intermediate and near additions without lines such that the lenses are cosmetically appealing and keep the optical changes acceptable to the patient. These advantages are accomplished by making the intermediate zone(s) with preferably a finite number of addition steps, designing the lenses with generally spherical sections which combine to form a unique aspheric surface, and providing acceptable power change in the distant–intermediate or intermediate–near junction zones.

Other advantages of the preferred lenses include having a distance zone with an isocylindrical value of about 0.00 diopters and a constant isospherical equivalent; providing an intermediate zone with a full intermediate add power from about 8° to about 28° of ocular depression; providing an intermediate zone with a usable add width of about 48°; providing a full near add power at about 28° of depression and a near add width of about 108°; providing an intermediate zone(s) with about 0.00 diopters of isocylindrical error and constant isospherical equivalent(s); providing an intermediate zone(s) with power(s) based upon vision needs thereby offering a larger zone(s) without power change; providing an intermediate zone having improved radial symmetry thereby eliminating a meridian eye path or principal meridian of progression and allowing a person to look down and to the left or down and to the right without visual distortion or blurring; providing a large near zone of generally spherical curvature whereby the isospherical equivalent is constant throughout and there is about 0.00 diopters of isocylindrical value or distortion; providing a near zone having radial symmetry that allows for down and left or down and right gazing without visual distortion or blurring thereby eliminating a meridian eye path or principal meridian of progression; providing connecting wedges that combine the top portion of the lens (i.e., generally the distance area) and bottom portion of the lens (i.e., generally the add area) on both the left and right sides of the front surface without lines; providing zones of inflection elimination between the add zones that are extremely small and can be referred to as thin circumferential optical power changes between the various powers that remove the lines; and providing an aspheric fringe which generally flattens the peripheral area on the bottom portion of the lens and also yields a thin and cosmetically acceptable lens.

It is, therefore, a general object of the present invention to provide improved ophthalmic no-line progressive addition lenses.

Other and further objects, features, and advantages of the present invention will become better understood with regard to the following description, appended claims, and accompanying drawings.

DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications, and equivalents, which may be included within the spirit and scope of the invention as defined by the appended claims.

Figure 1:
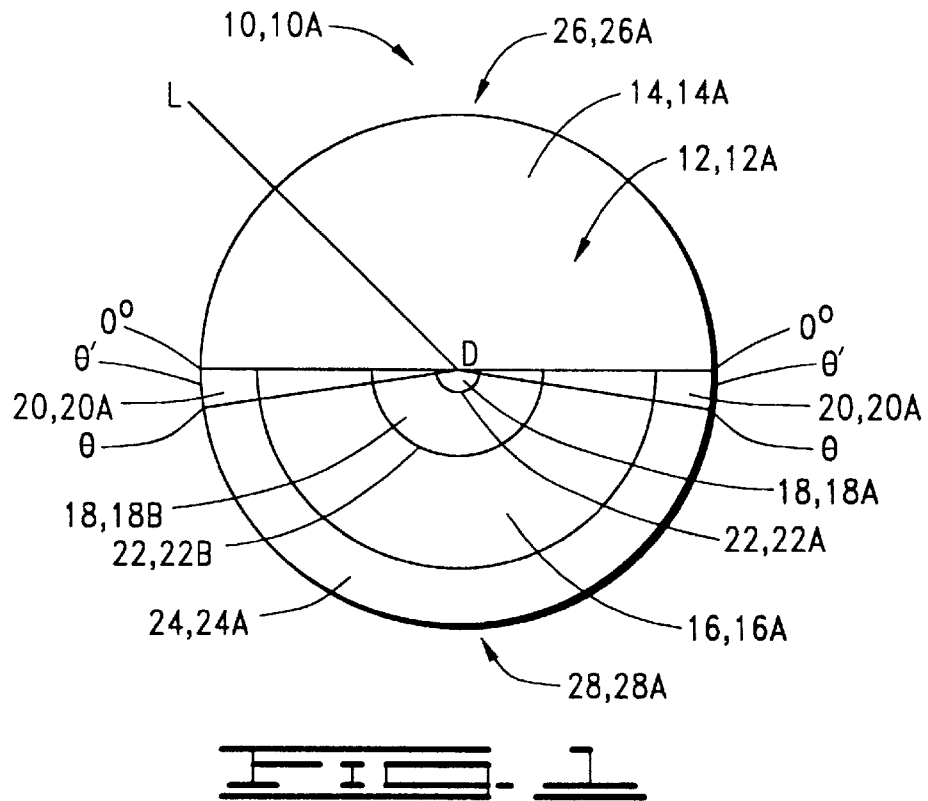
FIG. 1 illustrates a front lens surface in accordance with the present invention, wherein the lens includes a distance zone, intermediate zones, a near zone, connecting wedges, zones of inflection elimination (ZIE) and an aspheric fringe.
Figure 2:
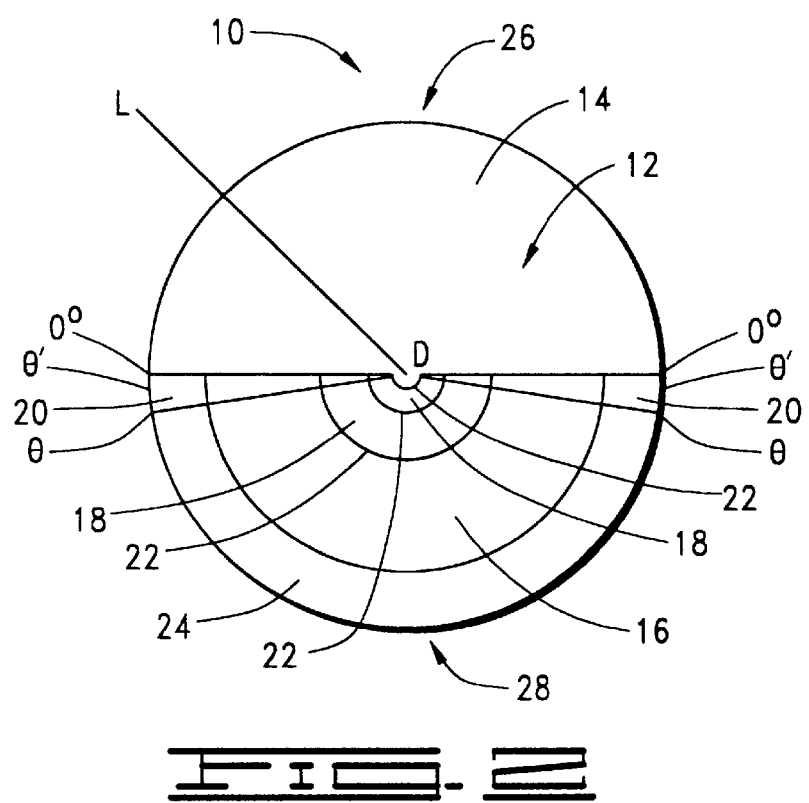
FIG. 2 illustrates a front lens surface in accordance with the present invention, wherein the lens includes a distance zone extended below the optical center of the lens, intermediate zones, a near zone, connecting wedges, zones of inflection elimination (ZIE) and an aspheric fringe.

Referring to FIGS. 1 and 2, various preferred embodiments of ophthalmic no-line progressive addition lenses 10 of the present invention are shown. A single lens 10 comprises two refractive surfaces formed on opposite sides of a block of refringent material, the back refractive surface being a spherical or toroidal surface and the front refractive surface 12 being a so-called progressive surface. The back surface and the front surface 12 determine therebetween an upper single focus distance zone 14 for far vision, a lower single focus near zone 16 for near vision having a higher focal power.

Additionally, lenses 10 of the present invention may comprise one or more intermediate zone(s) 18 which also have single focus powers. The focus power of the intermediate zone(s) 18 is between the focus powers of the distance and near zones 14, 16. Furthermore, it is understood that embodiments of the present invention may include lenses 10 which have no intermediate zone 18 or alternatively include only a single intermediate zone 18, thus, further increasing the size of the near zone 16.

The preferred lenses 10 are constructed of a known optical material having a uniform refractive index. Examples of these optical materials include either optical quality glass or one of the known optical quality plastic materials such as "CR-39" (allyl diglycol carbonate), "LEXAN" (polycarbonate), or other high index plastics.

Preferred embodiments of the invention provide two major advantages. First, large, usable intermediate and near addition zones 18, 16 are created. Second, the intermediate and near addition zones 18, 16 are established without the use of lines therebetween so that the lenses 10 are cosmetically appealing, while keeping the optical changes acceptable to the patient. For purposes of discussion, the areas of advantage of the preferred lenses 10 are further broken down into the distance zone 14, intermediate zone(s) 18, near zone 16, connecting wedges 20, zone(s) of inflection elimination (ZIE) 22, and aspheric fringe 24.

The first area to be discussed is the distance zone 14. Known progressive addition lenses generally yield good optics for distance vision, but are hampered by having 1.50 to 3.50 diopters of isocylindrical error if the patient looks left or right from primary gaze. A lens 10 of the present invention has substantially an equal amount of isospherical equivalent throughout its distance zone 14. In addition, the isocylindrical value will be less than about 1.50 diopters, and more preferably about 0.00 diopters for the distance zone 14 because it is a generally spherical base curve. Base curve is used in the optical industry to describe the front surface of a lens.

Aspects of the intermediate zone(s) 18 to be discussed are the amount of ocular depression required to obtain the intermediate add power, the width of the intermediate corridor, and the amount of ocular depression needed to obtain the full near add power. First, the amount of ocular depression needed to obtain the intermediate power will be discussed. For normal flat top trifocals, 10° to 12° of depression is required and is considered to be an appropriate amount relative to the normal 25° needed for near work. Known progressive addition lenses require 10° to 18° of depression to achieve the intermediate power. A preferred lens 10 of the present invention obtains this intermediate power and maintains it through the range of from about 8° to about 28° of ocular depression.

Next to be considered is the width of the intermediate corridor. Flat top 7×28 trifocals give 56° of width to their intermediate zones while known progressive addition lenses generally give only 2° to 11° of width thereto. A preferred lens 10 of the present invention has an intermediate width that is greater than about 11°, and more preferably about 48°.

The last dimension to consider is the ocular depression needed to reach the near add zone 16. In general, flat top bifocals and trifocals require about 20° of depression to reach their near add area, although this can vary with the placement of the seg height. In known progressive addition lenses, the patient is required to depress their eyes 27° to 32° to reach the near add area. A preferred lens 10 of the present invention requires about 28° of ocular depression to reach its full near add power; however, it is understood that alternative embodiments of the present invention may reach their near add power at a depression of about 8° or greater.

The next consideration is the isocylindrical values encroaching on the intermediate zone(s) 18. Known progressive addition lenses have 2.00 to 3.50 diopters of isocylindrical error that encroaches upon and narrows the intermediate corridors. In the lenses 10 of the present invention, there is less than about 2.00 diopters, and more preferably about 0.00 diopters of isocylindrical error in the intermediate zone(s) 18, with the zone(s) of inflection elimination to be discussed later. It is noted that the connecting wedges 20 will have unwanted isocylindrical values, but the connecting wedges 20 are placed below the distance zone 14 and above the intermediate zone(s) 18 in a normally unused area of the lens 10 relative to normal ocular placement for these areas whether this is ocular depression or lateral movements. The intermediate zone(s) 18 are defined by generally spherical sections, and therefore, they have constant isospherical equivalent values. Having about 0.00 diopters of isocylindrical value in these zone(s) 18 eliminates the distortion that patients presently see in the intermediate areas of known progressive addition lenses.

Next, the available powers are discussed with respect to the intermediate zone(s) 18. Known progressive addition lenses have an infinite number of powers in theory. However, the lenses 10 of the present invention can have a finite number of powers based on vision needs, thereby providing larger intermediate zones 18 without power change. Nevertheless, power changes are variable in number and dioptric amounts can vary up to an infinite number in the present invention. It is understood that the present lenses 10 can have one or a plurality of intermediate zone(s) 18 and that the powers are preferably maximized to offer the patient a smooth vision change.

The last aspect of the intermediate area design to be discussed is it's radial symmetry. That is to say, with the present invention the patient can gaze down and left or down and right to read without turning their head. With known progressive addition lenses gazing down and left or down and right results in moderate to extreme blur, visual distortion and overall visual confusion. Thus, a meridian eye path or principal meridian of progression need not be created like those found in today's known progressive addition lenses.

The third area of discussion is the near zone 16. The amount of ocular depression needed to reach the near zone 16 has already been discussed. However, another dimension to consider is the width of the near add zone 16. Conventional "flat top 28" bifocals and trifocals have a near add width of 56°. Known progressive addition lenses have near add widths of 3°–21° at 25° of ocular depression and increase to 9°–28° at 30° of depression. A preferred lens 10 of the present invention has its full near add power at about 28° of depression with a near add width of about 108°. Nevertheless, with respect to both the intermediate and near zones 18, 16, the degree of depression and degree of add width may be varied in size to accommodate each person's visual needs for each respective zone 18, 16. In addition, the isocylindrical value for the near add zone 16 will be less than about 2.00 diopters, and more preferably about 0.00 diopters for this zone 16 because it is a generally spherical base curve.

As previously mentioned, known progressive addition lenses comprise add zones which are constructed of sections with different aspheric curves, thus providing a small reading area surrounded by large areas of unwanted astigmatism and distortion. Versions of the present invention include lenses 10 with a large near zone 16 of generally spherical curvature, and therefore, the isospherical equivalent is constant throughout the near zone 16 with about 0.00 diopters of isocylindrical values or distortion. Again, the zones of inflection elimination 22 between the intermediate and near zones 18, 16 will be discussed below. Also, as with the intermediate zone(s) 18, the near zone 16 has radial symmetry thereby eliminating the need for a meridian eye path or principal meridian of progression and allowing for down and left or down and right gaze, which cannot be achieved with known progressive addition lenses because of moderate to extreme blur and distortion.

Because a preferred lens 10 surface is generated around a common axis, which is referred to herein as the line of diameters (line LD), if a vertical section through the optical center of the front surface 12 were turned clockwise and counter-clockwise and stopped at the horizontal meridian, there would be an abrupt change in curvature similar to an executive bifocal. For this reason, the grinding surface must be bi-pivotal. A top portion 26 of the lens 10 (i.e., generally the distance area) and a bottom portion 28 of the lens 10 (i.e., generally the add area) are each turned about their common axis but to different degrees. To achieve the aforementioned optics in the top portion 26 of the lens 10, the base curve on the top portion 26 is turned about the line of diameters clockwise and counter-clockwise stopping at the horizontal meridian or just above or below the horizontal meridian to yield a generally spherical base curve. The curve on the bottom portion 28 is turned clockwise and counter-clockwise about the line of diameters but stopped below the line on the front surface 12 of the lens 10 where the top portion 26 was stopped, thereby leaving a wedge area 20 (i.e., connecting wedges 20) that connects the top and bottom portions 26, 28 on both sides. The connecting wedges 20 connect the top and bottom portions 26, 28 on the left and right sides of the front surface 12 without lines. By way of example, stopping the bottom surface of the connecting wedges 20 6.56° below the top portion 26 will yield a reasonable distance of 4 mm at the edge of a 70 mm blank, although this and other parameters of the lens 10 can be varied to increase cosmetic and/or visual acceptance. Changes in the parameters of the lenses 10 will be further discussed hereinafter.

Three different ways are provided for creating the connecting wedges 20. The first way is to create radial progressive optics (the mathematical expressions to be explained later). There are isocylindrical values for the connecting wedges 20. Because this type of connecting wedges 20 does not conform to any standard geometric shape, the value for the isocylindrical values can most easily be calculated by making a prototype and measuring the astigmatism with a standard lensmeter that is modified to measure progressive addition lenses. Modification of the lensmeter for this purpose is known in the art.

The second way to create the connecting wedges 20 is to generate a doughnut toroidal shaped surface. The doughnut toroidal surface will also yield isocylindrical values with the astigmatism zones corresponding to their respective intermediate and near zones 18, 16, zone(s) of inflection elimination 22 and aspheric fringe 24.

A third way to create the connecting wedges 20 is to fill in the area with a smooth surface that abuts to the top and bottom portions 26, 28 of the lens 10 without creating inflection points or lines. This design would not require a specific geometric definition. Any of the three ways may be used to achieve the desired results of the present invention.

Another aspect of the preferred lenses 10 to be discussed is the inflection points where the generally spherical distance, intermediate and near zones 14, 18, 16 meet. Inflection points yield lines and create the prismatic jump seen in conventional lined bifocals and trifocals. The zone(s) over which the inflection points is/are eliminated is extremely small and can be thought of as thin circumferential optical power changes between the various powers, these zones are referred to herein as zones of inflection elimination (ZIE) 22. As can be seen by the defined construction herein, the inflection points may be totally eliminated but this will yield asphericity at that point and also an isocylindrical value.

Yet, another aspect to be considered with respect to the preferred lenses 10 is the aspheric fringe 24, which is located in the bottom portion 28 of the lens 10 and terminates at the distance zone 14. This aspheric fringe 24 is located at a distance of more than about 35° to 40°, and more preferably about 56° down and circumferentially from the optical center of the lens 10 and extends to the outer peripheral edge of the bottom portion 28 of the lens 10, although the dimensions of the aspheric fringe 24 may be varied. The limit for most people is 35° to 40° of ocular rotation; thus, in a preferred lens 10 the aspheric fringe 24 is well beyond what would be considered a usable area of the lens 10. The portions of aspheric fringe 24 that extend through the connecting wedges 20 vary from a generally convex spherical surface at the top of the connecting wedge 20, which abuts to the generally spherical top portion 26 or distance zone 14 without surface disruption, to a generally convex aspheric surface near the middle of the connecting wedge 20 and then to a generally concave aspheric surface near the bottom of the connecting wedge 20, which abuts the bottom portion 28. A radial cross-section of the aspheric fringe 24 can be defined as a circular section whose radius origin is not on the line of diameters. Furthermore, the radius preferably is of constant value throughout all angular extents of the aspheric fringe 24 and changes in its corresponding area of the connecting wedges 20 to a generally convex spherical surface.

If the aspheric fringe 24 were not incorporated into the lens 10 then the bottom portion 28 would become very steep causing the outer edge of the lens 10 to be excessively thick in the top portion 26 when finished, or the finished lens would need to have base down prism ground into it to reduce the edge and overall thickness thereof. Thus, important functions of the aspheric fringe 24 are to flatten the peripheral area of the bottom portion 28, decrease the finished lens, center thickness and to yield a thin and cosmetically acceptable lens 10. These advantages to the aspheric fringe 24 will yield an unfinished lens blank or a finished lens with the edge of the top portion 26 being thicker than the edge of the bottom portion 28 and with the thinnest portion being the area where the near zone 16 and the aspheric fringe 24 join. There is no inflection point where the near zone 16 and the aspheric fringe 24 join; however, the aspheric fringe 24 will have isocylindrical values.

EXAMPLES OF PREFERRED EMBODIMENTS OF THE PRESENT INVENTION

Using the equation $F=(n'-n)/r$, the radii for the front surface 12 powers can be calculated. For the purpose of discussion a blank size of 70 mm will be used, although these theories can be used for any blank size. Since the recent trend in the industry is toward thinner, more light weight lenses, a refractive index of 1.60 will be used, although any optical media is acceptable. Base curves for distance vision are usually +2.00D, +2.50D, +4.00D, +4.50D, +6.00D, +6.50D, +8.00D, or +8.50D, but any base curve may be used if it is a plus base curve.

Normal addition powers range from +0.75D to +2.50D in +0.25D steps, with +2.75D and +3.00D occasionally being used. It is understood that any plus addition power may be used and that any number of power changes can be used from the distance prescription to the final near addition power. However, to keep the intermediate zone(s) 18 large and usable, a small number of power changes are preferred. Also, the power changes can be varied in their dioptric amounts. Tables 1 and 2 give various examples of power addition changes that will meet many patients' visual needs, wherein each vertical column represents the dioptric powers of a separate lens.

TABLE 1

As illustrated in Table 1, zones 1 and 2 are the intermediate add powers, and zone 3 is the near add power.

| ZONE | ADDITION POWERS IN DIOPTERS | | | | | | | |
|---|---|---|---|---|---|---|---|---|
| 1 | +0.12 | +0.25 | +0.25 | +0.25 | +0.25 | +0.37 | +0.50 | +0.50 |
| 2 | +0.37 | +0.50 | +0.62 | +0.75 | +0.87 | +1.00 | +1.12 | +1.25 |
| 3 | +0.75 | +1.00 | +1.25 | +1.50 | +1.75 | +2.00 | +2.25 | +2.50 |

TABLE 2

As illustraed in Table 2, zones 1, 2 and 3 are the intermediate add powers, and zone 4 is the near add power.

| ZONE | ADDITION POWERS IN DIOPTERS | | | | | | | |
|---|---|---|---|---|---|---|---|---|
| 1 | +0.12 | +0.25 | +0.25 | +0.25 | +0.25 | +0.37 | +0.50 | +0.50 |
| 2 | +0.37 | +0.50 | +0.37 | +0.50 | +0.62 | +0.75 | +0.87 | +1.00 |
| 3 | +0.37 | +0.50 | +0.87 | +1.00 | +1.12 | +1.25 | +1.37 | +1.50 |
| 4 | +0.75 | +1.00 | +1.25 | +1.50 | +1.75 | +2.00 | +2.25 | +2.50 |

FIGS. 1 and 2 illustrate examples of the front surface 12 of preferred lenses 10 which demonstrate various ways that the intermediate zone(s) 18, near zone 16, and zones of inflection elimination (ZIE) 22 may be varied in size. It is understood that the angular extent of the connecting wedges 20 and their location may also be varied but these variations are not shown in the figures. The aspheric fringe 24 illustrated in these examples may also be varied in size or location.

FIG. 1 may be defined by the following specifications: 70 mm blank, intermediate zones 18 with vertical distances of 0 mm to about 3 mm and 3 mm to about 12 mm, and a near zone 16 of 12 mm to about 27 mm below the optical center D, ZIE 22 between the intermediate and near zones 18, 16, an aspheric fringe 24 about 27 mm to 35 mm below the optical center D, 6.56° connecting wedges 20, and a line of diameters (LD) which is normal to the optical center and located behind the lens 10.

FIG. 2 may be defined by the following specifications: 70 mm blank, a distance base curve 14 extending about 2 mm below the optical center D, intermediate zones 18 with vertical distances of 2 mm to about 5 mm and 5 mm to about 12 mm, and a near zone 16 of 12 mm to about 27 mm below the optical center D, ZIE 22 between the distance, intermediate and near zones 14, 18, 16, an aspheric fringe 24 about 27 mm to 35 mm below the optical center D, 6.56° connecting wedges 20, and a line of diameters (LD) which is normal to the optical center and located behind the lens 10. As shown, the lens 10 of FIG. 2 will yield a separation or corridor between the connecting wedges 20.

For purposes of illustration, discussion of an example of a preferred lens 10A of the present invention is now provided. The principals of the present invention can readily be demonstrated by a diagrammatical presentation of the geometry and optics. However, the distance zone 14A, intermediate zone(s) 18A and 18B, near zone 16A, ZIEs 22A and 22 D, connecting wedges 20A, aspheric fringe 24A and variations thereof can be represented by nonlinear equations.

Figure 3:
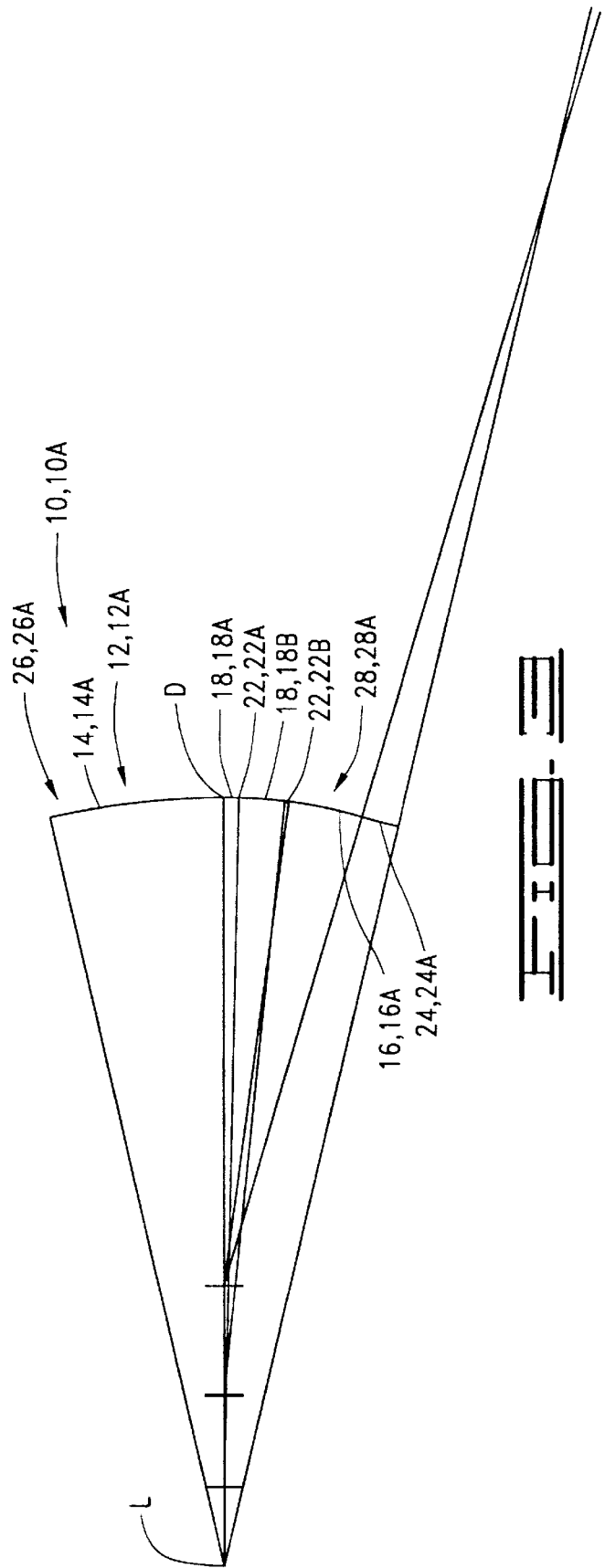
FIG. 3 illustrates a vertical section view of a front lens surface in accordance with the present invention, wherein the view is through the geometrical and optical center of the lens.

The lens 10A of this example is defined as having a top portion 26A that progresses to a +2.50D near add in the bottom portion 28A. The power changes in Table 1 and the distance, intermediate and near zones 14A, 18A, 18B and 16A shown and referred to in FIG. 1 will also be used. The front surface 12A base curve will be +4.00D for the distance zone 14A and progress to +6.50D for the near add zone 16A. In this example, the radii for the front surface 12A powers will be 0.15 m for the distance zone 14A, 0.133 m for the intermediate zone 18A, 0.114 m for the intermediate zone 18B, and 0.092 m for the near zone 16A. The blank size is 70 mm with an index of refraction of 1.60. (Note: The following steps provided hereinafter can be used for any blank size, with any optical media, with any distance base curve, with any number of intermediate powers and zone sizes, with any final near add power and zone size, with varying sizes and locations of connecting wedges 20A and an aspheric fringe 24A of variable size). FIG. 3 illustrates a complete diagram of the vertical section of the front surface 12A through the geometrical and optical center of the lens 10A used in this example. The following steps are given to diagrammatically produce and illustrate the front surface 12A characteristics of the lens 10A of this example.

1. Draw a horizontal line that is 0.15 m long. The right end of the line is point D and the left end of the line is point L. This will be the common axis or line of diameters (line LD) and will contain the origins of the radii of the spherical sections. It is understood that the radii origins may be placed just above or just below line LD to provide alternative embodiments of the present invention.

2. Set a bow compass to 0.15 m, place the point of the compass on point L of line LD and draw an arc from point D of line LD up to a point that is a vertical distance of 35 mm above line LD. This creates the distance zone 14A.

3. To define intermediate zone 1 18A, set the bow compass to 0.133 m, place the point of the bow compass on point D of line LD and make a mark on line LD. This mark is the origin for the 0.133 m radius. Place the point of the bow compass at the origin of the 0.133 m radius, with the bow compass set at 0.133 m, and draw an arc from point D of line LD down to a point that is to be the vertical depth of zone 1 18A below line LD. No inflection point will be generated at point D. With a straight edge, draw a line from the origin of the 0.133 m radius to the point at the bottom of zone 1 18A.

4. The next curvature change would result in an inflection point unless a very small zone of inflection elimination (ZIE) 22A is created. The vertical depth that this zone extends below line LD is variable, but must be small. To make the ZIE 22A between zone 1 18A and zone 2 18B, set the bow compass to a length of 0.114 m, place the point of the bow compass on the point at the bottom of zone 1 18A, and mark a point on line LD which is the origin of the 0.114 m radius. Place the point of the bow compass at the origin of the 0.114 m radius, with the bow compass still set at 0.114 m, and mark a point below zone 1 18A at the vertical depth that the bottom of the ZIE 22A dimension is to be.

5. Use a straight edge and draw a line from the origin of the 0.114 m radius to the point which is to be the vertical depth to the bottom of the ZIE 22A dimension. The line from the origin of the 0.133 m radius to the point at the bottom of zone 1 18A and the line from the origin of the 0.114 m radius to the point at the vertical depth that is to be the bottom of the ZIE 22A dimension will cross at a unique point. The point is unique in that it lies on the 0.133 m radius and the 0.114 m radius. It can be shown by construction that the distance from the point where the two lines cross to the bottom of zone 1 18A and the distance from the point where the two lines cross to the point at the vertical depth that is the bottom of the ZIE 22A dimension are about equal with the first distance being only a few hundredths of a millimeter longer.

6. Place the bow compass point where the 0.133 m and 0.114 m radii cross from step 5, set the bow compass so that the writing point is at the point at the bottom of zone 1 18A and then draw an arc down the distance that the vertical dimension of the ZIE 22A is to be. There will be no inflection point at the junction of the bottom of zone 1 18A and the top of the ZIE 22A.

7. Place the point of the bow compass at the origin of the 0.114 m radius on line LD and set the writing point at the point at the bottom of the ZIE 22A, which would be an extension of the line from the 0.114 m radius origin to the point at the vertical depth that is the bottom of the ZIE 22A dimension (Note: The length of the radius is going to be a few hundredths of a millimeter longer than 0.114 m, but this will yield little dioptric change). Draw an arc down to a point that is to be the vertical depth of zone 2 18B below line LD. There will be no inflection point at the junction of the bottom of the ZIE 22A and the top of zone 2 18B. The ZIE 22A will be aspheric and contain isocylindrical values, but the area will be small and appear as an optical power change (not a line) between zones 1 and 2 18A, 18B. Draw a line from the origin of zone 2 18B radius to the point at the bottom of zone 2 18B. Alternatively, to decrease the ZIE 22A asphericity, a variable number of small dioptric increases can be made between the powers of zones 1 and 2 18A, 18B to place a variable number of ZIE 22 on top of each other using the technique just described.

Figure 4:
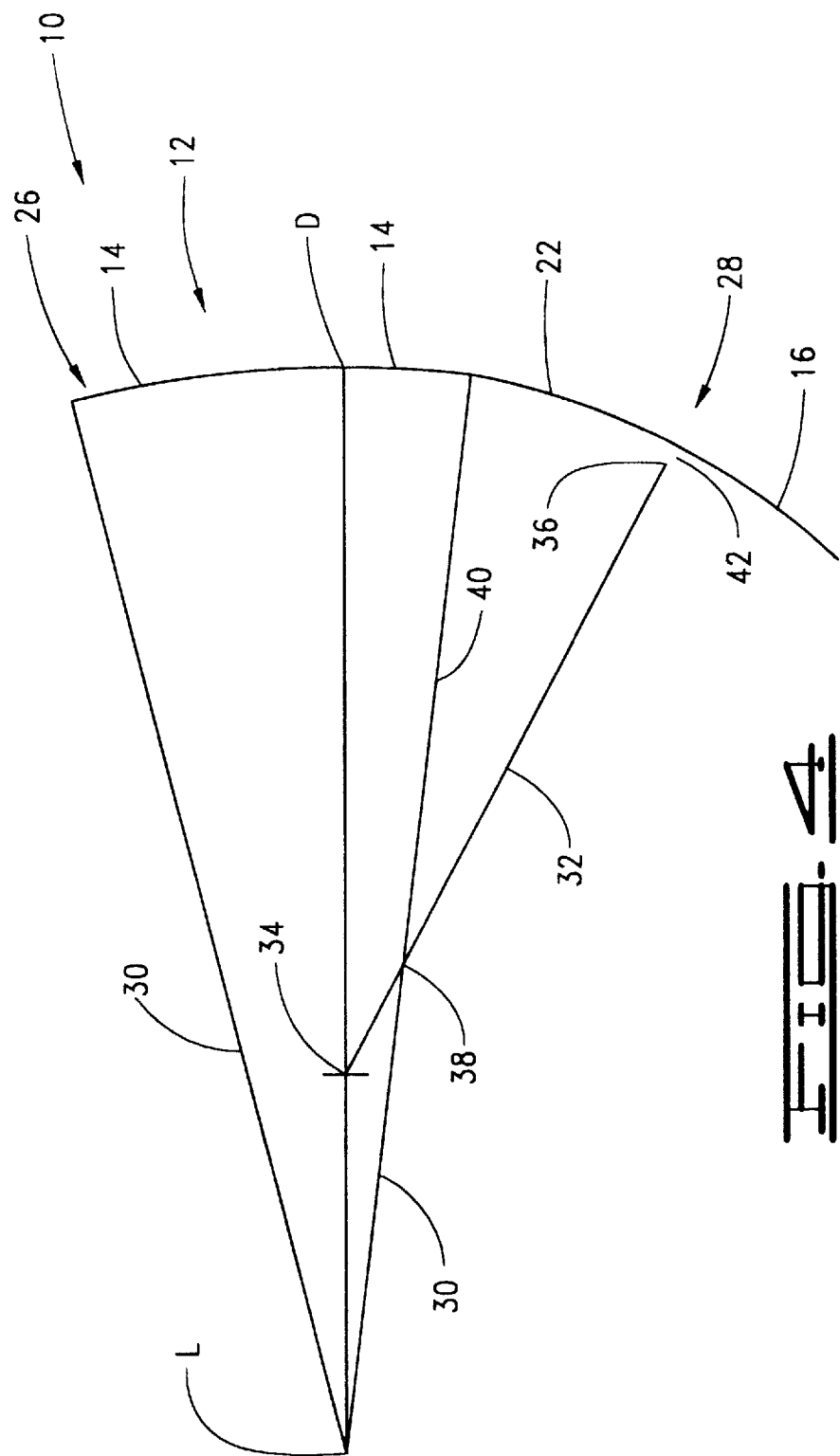
FIG. 4 illustrates an enlarged portion of a lens according to the present invention, wherein the geometry used to create a zone of inflection elimination (ZIE) is shown.

FIG. 4 illustrates an enlarged portion of a lens 10 according to the present invention, wherein the geometry used to create a ZIE 22 is illustrated. A line LD is drawn and the longer distance radius 30 with its origin at point L is used to draw the distance zone 14 which extends below the optical center D. A straight edge is used to draw the distant radius 30 from point L to the point at the bottom of distance zone 14. A shorter near radius 32 is set with the bow compass. The point of the bow compass is placed at the point at the bottom of the distance zone 14 and a mark is made on line LD to make the origin of the near radius 32 at a first point 34. The point of the bow compass is then placed at the first point 34 and the writing edge of the bow compass makes a second point 36 while the bow compass is still set with the near radius 32. A straight edge is used to draw a line from the first point 34 to the second point 36. The second point 36 represents the vertical depth that the ZIE 22 dimension is below line LD and distance zone 14. The two previously described radii lines 30 and 32 cross at a third point 38 which is the radius origin for the ZIE 22. The point of the bow compass is then set at the third point 38 and the bow compass writing point is placed at the point at the bottom of the distance zone 14 to set the ZIE 22 radius length 40. An arc is then drawn from the point at the bottom of the distance zone 14 to a point that is to be the vertical depth of the ZIE 22 dimension, below line LD or the distance zone 14. The point at the bottom of the ZIE 22 must be an extension of the near radius 32. Also, a space 42 is created between the second point 36 and the point at the bottom of the ZIE 22. This space 42 is the amount that the near radius 32 must be lengthened. The bow compass point is then placed at the first point 34 and a new near radius length is set as a total of the near radius 32 and space 42. The writing point is then placed at the point at the bottom of the ZIE 22 and the near add zone 16 is drawn.

8. The radius of near zone 3 16A begins with 0.092 m. Using the line from the origin of zone 2 18B radius to the point at the bottom of zone 2 18B, and the new near radius length of 0.092 m, the technique described in steps 4 through 7 can be utilized to create a ZIE 22B between zones 2 and 3 18B, 16A. When the arc is drawn from the bottom of this ZIE 22B to create the spherical near zone 3 16A it should extend down to a point that is a vertical depth of 27 mm below line LD, but this depth can vary.

9. With the compass still at the origin of the near add zone 3 16A radius on line LD, move downward and make a point that is at a vertical depth of 35 mm below line LD. Do this with the same radius that was used for zone 3 16A (which would be slightly longer than 0.092 m). Alternately, this point could be placed closer to or further from line LD to shorten or lengthen the radius of the aspheric fringe 24A.

10. Draw a line from the origin of the near add zone 3 16A radius through the point at the bottom of zone 3 16A extending it approximately to the left or right of the front surface 12 that has been drawn. Also, draw a line from point L on the left end of line LD through the point that is 35 mm below line LD, extending it to the left or right, until it crosses the line described in the first part of this step.

11. Place the point of the bow compass where the two lines cross from step 10. Adjust the bow compass so that the writing edge is at the point at the bottom of the near zone 3 16A and draw an arc downward to a new point that is at a vertical depth of 35 mm below line LD. This establishes an aspheric fringe 24A. Alternatively, the aspheric fringe 24A radius may be either longer or shorter, as desired. There will be no inflection point where the bottom of zone 3 16A and the top of the aspheric fringe 24A meet, and thus, no zone of inflection elimination is created.

12. To generate the front surface 12A of the lens 10A, the arc above line LD will be rotated about the axis LD to create a spherical base curve of +4.00D. Where the +4.00D base curve stops can be at the horizontal meridian through the geometric center of the lens blank, or it can extend just above or below the horizontal meridians or the tops of the connecting wedges 20A could be a combination of these. Therefore, the tops of the two connecting wedges 20A are independent of each other with respect to their angular placement on the front surface of the lens 10A and the top of the connecting wedge 20A on the right and left sides can be placed at different angular extents with respect to the horizontal median. Where this curvature stops is defined as 0°.

13. The arc that is below line LD will also be rotated about axis LD to yield large spherical intermediate and near zones 18A, 18B and 16A, small aspheric ZIEs 22A, 22B and an aspheric fringe 24A. This arc can be stopped at any angular extent below what has been defined as 0° and this line will be defined as θ. Therefore, the bottom of the two connecting wedges 20A are independent of each other and can be placed at the same or different angular extents below the two lines defined as 0° which are on both the right and left sides of the lens 10A. This will leave the need for connecting wedges 20A between the top and bottom portions 26A, 28A on both sides of the lens 10A.

14. The connecting wedges 20 or 20A may be expressed as $\lim f(x)X=F_D+(\theta'/\theta)(F_A)$. Where X is the base curve for a given intermediate zone 18 or near zone 16 at a given angular extent, $F_D$ is the dioptric power of the base curve in the distance zone 14 of the lens 10, $F_A$ is the dioptric addition to the distance base curve 14 for an intermediate zone 18 or near zone 16 at θ, 0° is defined as the line where the distance base curve 14 stops, θ is the line at the angular extent to which the bottom portion 28 of the lens 10 is stopped below 0°, and θ' is any angular extent between 0° and θ, including 0° and θ. Then the base curve at θ' and its corresponding radius may easily be calculated for any intermediate or near zone 18, 16 and the ZIE 22 and aspheric fringe 24 can be constructed for the new radii. The ratio θ'/θ can be varied by changing the power or root of this portion of the equation to determine the rate of progression.

The curvature of the front surface 12A of the lens 10A at θ' from the optical center of the lens 10A to the edge of the lens 10A is established as described in previous steps 1–11 using the dioptric powers X at all angular extents of θ' for the intermediate and near zones 18A, 18B and 16A and by constructing the intermediate and near zones 18A, 18B, 16A, the ZIEs 22A, 22B and the aspheric fringe 24A at all extents of θ'. This completes the front surface 12A of the lens 10A.

In an alternative embodiment of the present invention, the line defined as θ does not have to be a straight line but rather it is constructed in a "stairstep fashion". The intermediate zones 18 and near zone 16 may be stopped at varying angular extents. Then the equation is solved in the same manner for each intermediate zone 18 and near zone 16. The intermediate zones 18 and near zone 16 could also have various rates of power change.

Example: In the front surface 12 from the previous steps, the distance base curve is +4.00D, the near zone 16 addition is +2.50D (or +6.50D base curve), if the angular extent of the connecting wedge 20 is 6.56° at θ, then what is the base curve of the near zone 16 at θ' if θ' is 3.28°?

Answer: $X = +4.00D + (3.20°/6.56°)(+2.5D) =$
$+5.25D$ base curve (or $+1.25D$ add)
or by a different rate of change:
$X = +4.00D + (3.28°/6.56°)^2(+2.50D) =$
$+4.625D$ base curve (or $+0.625D$ add)

The variation of changing the power or root of (θ'/θ) are numerous. Also, the rate of change of the two connecting wedges 20 may differ and the intermediate and near zones 18, 16 may have different rates of change. The various rates of change may be incorporated to produce various embodiments of the present invention.

Alternatively, another way to create connecting wedges 20 is to generate a doughnut toroidal shaped surface. The top and bottom portions 26, 28 of the lens 10 are established in the same manner as previously described. When the bottom portion 28 of the lens 10 has reached the desired angular extent below what is defined as 0°, the bottom portion 28 of the lens 10 is turned about point L with point D going along the line defined as 0°, while the arc of the bottom portion 28 of the lens 10 is vibrated +/− some small angular extent.

The detailed description in steps 1–14 disclose how the various components are employed to create the unique aspheric front surface 12 of the present invention. The front surface 12 is preferably prefabricated for optical laboratories. The back surface will then be ground by the optical laboratories using standard means known in the art, whereby the optical center is preferably at point D. However, it is understood that the back surface may be altered such that point D is not in the optical center. In an alternative, base down prism may also be incorporated into the lens 10 to make the edges of the top portion 26 and the bottom portion 28 approximately equal. The center thickness of the lens 10 will also need to take into account that the edge of the top portion 26 will be thicker than the edge of the bottom portion 28 and that the thinnest portion of the lens 10 will be where the bottom of the near zone 16 adjoins to the aspheric fringe 24.

Alternatively, as previously mentioned, a first intermediate zone 18 between the distance and near zones 14, 16 may contain the distance base curve (i.e., no plus addition). This would separate the connecting wedges 20 and create a better lens design based on some patients' needs. Another alternative includes all the intermediate and near zones 18, 16 containing the same power (i.e., one large near addition zone); therefore, there would be no need for any ZIE 22 if the distance base curve stops at the optical center. Yet, another alternative is to extend the distance base curve below the optical center and have only one add zone with the near addition power and one ZIE 22. Each of these alternative embodiments would also comprise an aspheric fringe 24 and connecting wedges 20.

The above described front surface 12 designs are preferably developed into molds of different base curves and different addition powers using computer controlled machinery known in the art or any other suitably known means. The mold is preferably used with injection molding techniques and equipment known in the art for producing lenses made of optical quality plastic materials. Furthermore, if a glass lens is desired, any suitably known methods of producing glass lenses may be utilized as long as the front surface 12 of the lens 10 corresponds to the present invention described herein. Thus, it is preferred to yield lens blanks having finished front surfaces 12, unfinished back surfaces which may be ground by an optical lab to correspond to a person's prescription and edged to correspond to the size and shape of the patients' frames. Lenses 10 of the present invention are preferably inserted into conventional eyeglass frames.

The geometric center and the optical center of the lens 10 are preferably the same. To fit the lens 10, the center of the pupil is placed about 2 mm above the geometrical center and the lens 10 is decentered about 1 mm nasally. It is understood that these placements can be varied based upon a person's physical characteristics and visual needs.

There are several ways to describe spheres or circles or sections of spheres or circles. Some ways are diameters, radii, chords, hemichords, sagittal depths, and areas. If a line of known dimension is placed on either side of the front surface 12 then calculus can be used to describe the height of the curve or the area under the curve. Also, topographical analysis can be used to describe the height of all the points on the surface. Hence, any number of these methods can be used to describe the present invention and each one would yield the same novel lens design of the preferred embodiments illustrated herein.

The foregoing descriptions of specific embodiments of the present invention have been presented for purposes of illustration and description. They are not intended to be exhaustive or to limit the invention to the precise forms disclosed and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the embodiments described herein and their equivalents.

What is claimed is:

1. An ophthalmic lens comprising:
   a distance zone having a generally spherical base curve;
   an addition zone having a generally spherical base curve; and
   means for connecting said distance zone with said addition zone, wherein said means for connecting has an aspheric base curve.

2. The lens of claim 1 wherein said means for connecting comprises a pair of connecting wedges.

3. The lens of claim 2 wherein said distance zone extends below the optical center of the lens and between said connecting wedges.

4. The lens of claim 1 wherein said means for connecting is defined by the equation:

$$\lim f(x) X = F_D + (\theta'/\theta)(F_A)$$

where X is the base curve for said addition zone at a given angular extent; $F_D$ is the dioptric power of the base curve in said distance zone; $F_A$ is the dioptric addition to the distance zone base curve for said addition zone at $\theta$; 0° is defined as a line where the distance zone base curve stops; $\theta$ is a line at the angular extent to which a bottom portion of the lens is stopped below 0°; and $\theta'$ is all angular extents from 0° to $\theta$ including 0° and $\theta$.

5. The lens of claim 4 wherein the line defined as $\theta$ is non-linear.

6. The lens of claim 1 wherein said means for connecting comprises a doughnut toroidal shaped surface.

7. The lens of claim 1 wherein said means for connecting comprises a smooth surface which abuts said distance zone and said addition zone without creating an inflection point or line therebetween.

8. The lens of claim 1 wherein said distance zone has an isocylindrical value of less than about 1.50 diopters.

9. The lens of claim 1 wherein said addition zone has an isocylindrical value of less than about 2.00 diopters.

10. The lens of claim 1 further comprising an intermediate addition zone located between said distance zone and said addition zone, said intermediate addition zone has a generally spherical base curve and is connected to said distance zone and said addition zone by said means for connecting.

11. The lens of claim 10 wherein said addition zone comprises a generally semi-annular shaped surface area of the lens and said intermediate addition zone comprises a generally semi-circular shaped surface area of the lens.

12. The lens of claim 10 wherein said addition zone and said intermediate addition zones generally have radial symmetry about the optical center of the lens.

13. The lens of claim 1 further comprising a plurality of intermediate addition zones located between said distance zone and said addition zone, said intermediate addition zones have generally spherical base curves and are connected with said distance zone and said addition zone by said means for connecting.

14. The lens of claim 1 further comprising an aspheric fringe below said distance zone, said aspheric fringe begins more than about 35° down and circumferentially from the optical center of the lens.

15. The lens of claim 1 further comprising an aspheric fringe with a portion thereof extended through said means for connecting, said portion of aspheric fringe that is extended through said means for connecting varies from a generally convex spherical surface at the top of said means for connecting which abuts to said distance zone, to a convex aspheric surface near the middle of said means for connecting and then to a concave aspheric surface near the bottom portion of said means for connecting.

16. An ophthalmic lens comprising:
    a distance zone having a generally spherical base curve;
    a plurality of addition zones, each addition zone having a generally spherical base curve; and
    means for connecting said distance zone with said plurality of addition zones, wherein said means for connecting has an aspheric base curve.

17. The lens of claim 16 wherein the lens comprises a zone of inflection elimination between two of said plurality of addition zones.

18. The lens of claim 16 wherein said distance zone has an isocylindrical value of less than about 1.50 diopters and each of said plurality of addition zones has an isocylindrical value of less than about 2.00 diopters.

19. The lens of claim 16 further comprising an aspheric fringe with a portion thereof extended through said means for connecting, said portion of aspheric fringe that is extended through said means for connecting varies from a generally convex spherical surface at the top of said means for connecting which abuts to said distance zone, to a convex aspheric surface near the middle of said means for connecting and then to a concave aspheric surface near the bottom portion of said means for connecting.

20. An ophthalmic lens comprising:
    a plurality of zones, each zone having a generally spherical base curve;
    connecting wedge means for connecting said zones, said connecting wedge means having an aspheric base curve; and
    a zone of inflection elimination which connects a pair of said zones.

* * * * *